United States Patent [19]
Büssow et al.

[11] Patent Number: 6,079,279
[45] Date of Patent: Jun. 27, 2000

[54] SUSPENDED-BODY FLOW METER

[75] Inventors: Jürgen Büssow, Duisburg; Henrik Krisch, Krefeld; Günter Musiol, Duisburg, all of Germany

[73] Assignee: Krohne Messtechnik GmbH & Co. KG, Duisburg, Germany

[21] Appl. No.: 08/926,555

[22] Filed: Sep. 10, 1997

[30]  Foreign Application Priority Data

Sep. 11, 1996 [DE] Germany .......................... 196 36 778
Sep. 24, 1996 [DE] Germany .......................... 196 39 060

[51] Int. Cl.⁷ ...................................................... G01F 1/24
[52] U.S. Cl. ............................................................. 73/861.56
[58] Field of Search ............................ 73/861.56, 861.77

[56]  References Cited

U.S. PATENT DOCUMENTS

| | | | |
|---|---|---|---|
| 3,315,523 | 4/1967 | Conkling | 73/209 |
| 4,306,457 | 12/1981 | Fukui et al. | 73/861.77 |
| 4,944,190 | 7/1990 | Scally et al. | 73/861.58 |
| 5,187,988 | 2/1993 | Dettmer et al. | 73/861.56 |
| 5,327,789 | 7/1994 | Nijdam | 73/861.56 |
| 5,520,058 | 5/1996 | Campbell et al. | 73/861.08 |

FOREIGN PATENT DOCUMENTS

| | | |
|---|---|---|
| 1 648 097 | 3/1967 | Germany . |
| 17 73 798 | 10/1971 | Germany . |
| 30 27 763 | 2/1981 | Germany . |

OTHER PUBLICATIONS

Agnetfabrik Chramberg, Magnetisierungsarten, p. 5.

*Primary Examiner*—William Oen
*Assistant Examiner*—Jewel V. Thompson

[57]  ABSTRACT

A suspended-body flow meter for flowing media of the type having a measuring tube, a suspended body that can move in the flow direction and is arranged in the measuring tube, at least one permanent magnet connected to the suspended body, at least one rotatably mounted follower magnet that follows the movements of the permanent magnet connected to the suspended body and arranged outside the measuring tube and a display device converting the movements of the follower magnet, the follower magnet being constructed as an annular permanent magnet. In the suspended-body flow meter, scales with the same spread can be used regardless of the nominal width of the measuring tube and without requiring special aids or corrective means due to the fact that the annular follower magnet is magnetized laterally and on its coupling part closer to the measuring tube, the north pole and the south pole form an angle of preferably about 90°.

19 Claims, 7 Drawing Sheets

SUSPENDED-BODY FLOW METER

The invention concerns a suspended-body flow meter for flowing media having a measurement tube, a suspended body that can move in the flow direction and is arranged in the measuring tube, at least one permanent magnet connected to the suspended body, at least one follower magnet rotatably mounted, that follows the movements of the permanent magnet connected to the suspended body and is arranged outside the measuring tube, and a display device converting the movements of the follower magnet, wherein the follower magnet is constructed as an annular permanent magnet.

BACKGROUND OF THE INVENTION

Suspended-body flow meters have been used since the middle of the past century to find volume and mass flow in closed pipelines. Today they can still be found in roughly one out of every five flow-meter devices in the chemical and processing industries.

A suspended-body flow meter, in its simplest embodiment, consists of a conical measuring tube and the suspended body. The measuring tube is a conical tube that is wider at the top and through which the liquid or gas stream to be measured flows from bottom to top, in which the suspended body, a measuring body that can move freely vertically and is designed for the purpose, is found, which forms a throttle site along with the measuring tube. The density of the suspended body is greater than that of the fluid. Depending on the flow, the suspended body is set in the built-up state at a certain height in the measuring tube which is caused by the equilibrium of the hydrodynamic force caused by the flow transmitted to the suspended body and the difference in the weight and lift forces of the suspended body. This height is either read directly by the observer on a scale on a glass measuring tube or is transmitted through a magnetic coupling to an external scale and/or an electrical transducer. The suspended-body flow meters in question have one like this, in which the height of the suspended body can be transmitted by a magnetic coupling via an external follower magnet to a scale and/or an electrical transducer.

Besides the forms of embodiment with conical measuring tubes and ball-shaped or sharp-edged suspended bodies, measuring tubes with a measuring orifice and a conical suspended body within the orifice opening can also be used. It is also conceivable to arrange the measuring tube not vertically, and in this case it is necessary to replace the weight force of the suspended body. However, the invention is independent of the potential variations described in the design of a suspended-body flow meter.

A suspended body flow meter is known from the prior art (see U.S. Pat. No. 4,944,190), which has at least one follower magnet arranged outside the measuring tube that follows the movements of the permanent magnets here directly forming the suspended body, where the follower magnet in the state of the art is constructed to be annular and this annular follower magnet is diametrically magnetized, hence staggered by 180° and has one north and one south pole.

The problem in the prior art is that the annular follower magnet has different angles of rotation depending on the nominal width of the measuring tube, the stroke of the suspended body remaining equal. This means that when suspended-body flow meters are produced, dependent on the nominal width of the measuring tube used, either scales with a different spread are used to display the movements of the follower magnet or other means of correction must be used. Such means of correction, which permit the use of scales with the same spread, consist of using counterweights or auxiliary rods, for example.

The problem outlined above can basically be avoided by detecting the movements of the follower magnet electronically with magnetic field sensors and then correcting the different angle of rotation using an amplification factor dependent on the nominal width. But in many cases, this is not wanted, since one decisive advantage of the suspended-body flow meters is often that, for example, in contrast to a magnetically inductive flow meter, it also supplies a measured value without auxiliary energy. For this reason, many suspended-body flow meters have an electronic measurement signal output, but at the same time dispense with the purely mechanical display.

SUMMARY OF THE INVENTION

The object of the invention is to fashion and further develop the known suspended-body flow meter for flowing media in such a way that scales with the same spread can be used for the mechanical display without extra or corrective means.

According to a first aspect of the invention, the annular follower magnet is magnetized laterally and the north pole and the south pole form an angle of preferably about 90° on its coupling part closer to the measuring tube.

In the known suspended body flow meter on which the invention is based (see U.S. Pat. No. 4,944,190), as already stated, the follower magnet is magnetized diametrically. In contrast, the follower magnet in the suspended-body flow meter according to the invention is magnetized laterally. For types of magnetization common to permanent magnets and hence also for diametric magnetization and lateral magnetization, please refer to Page 5 of the 1991 edition of the catalog of MAGNETFABRIK SCHRAMBERG GMBH & CO. in Schramberg-Sulgen.

In relation to the suspended-body flow meter according to the invention, it was stated above that on the follower magnets used in it, the north pole and the south pole on its coupling part closer to the measuring tube form an angle of preferably about 90°. The "coupling part of the follower magnet closer to the measuring tube" is understood as the part of the follower magnet that, along with the permanent magnet connected to the suspended body, represents the magnet coupling between the suspended body and the display device. The follower magnet thus has one part closer to the measuring tube and one part farther away from the measuring tube; the part of the follower magnet closer to the measuring tube is the coupling part.

When it is said in connection with the suspended-body flow meter according to the invention that on the follower magnet on its coupling part closer to the measuring tube, the north pole and the south pole form an angle of preferably about 90°, the 90° angle is understood only as a preferred value, since the angle can be varied within relatively wide limits, but should clearly be under 180°.

Surprisingly, it has been found that when the follower magnet of the suspended-body flow meter according to the invention is designed in the way explained, the angle of rotation is practically no longer dependent on the nominal width of the measuring tube, i.e., it is only, as functionally desired, dependent on the stroke of the suspended body. Consequently, scales with the same spread can be used with different nominal measuring tube widths, with no need for the auxiliary or corrective means described at the outset.

At the suspended-body flow meter according to the invention, the follower magnet is preferably arranged so that its median plane does not contact or intersect the measuring tube, and the distance between the axis of the follower magnet and the axis of the measuring tube is greater then zero. This means that the angle of rotation of the follower magnet dependent on a certain stroke of the suspended body can be predetermined by the distance between the axis of the follower magnet and the axis of the measuring tube. This also makes it possible to use scales with identical spread over a very wide range of different nominal measuring tube widths as well. For example, it is possible to provide a housing holding the complete display device with two different possibilities of attachment, for example with four attachment holes, so that the first possibility of attachment can have an effect on a first range of different nominal widths and the second possibility of attachment on a second range of different nominal widths.

One especially preferred embodiment of the suspended-body flow meter according to the invention is now further characterized by the fact that a magnetically open metal bushing is provided in the direction of the measuring tube, and the follower magnet goes into the metal bushing without contact, wherein the metal bushing is made of electrically conductive, non-ferromagnetic material, for example aluminum or copper.

Depending on fluctuations of the flow in the measuring tube, the suspended body can, following the flow, change its position not only proportionally, but can also, depending on its own inertia, go over and under the point of equilibrium. Now, the suspended body forms a spring-force system with the follower magnet, so that the display device converting the movements of the suspended body via the follower magnet reflects these fluctuations in the suspended body disproportionately. This problem is solved by the measure described above, hence by the fact that the follower magnet forms an eddy current brake in connection with the metal bushing that effectively damps the fluctuations mentioned.

On suspended-body flow meters, it is known to realize eddy current brakes. In the prior art, however, another follower magnet is provided for this. In the design of the suspended-body flow meter according to the invention described, in contrast only one follower magnet is provided, which beside its own function, namely to form a magnetic coupling along with the permanent magnet connected to the suspended body between the suspended body and the display device, works as an eddy current brake with the metal bushing.

The effect of the above-mentioned eddy current brake designed on the suspended-body flow meter according to the invention can be amplified by various measures. First of all, it is recommended that the air gap between the follower magnet and the metal bushing be designed as small as possible. It is also advantageous to use a follower magnet that is made of a rare earth metal; especially, a samarium-cobalt alloy can be used, for example, $SmCo_5$ or $Sm_2CO_{17}$. Since the effect of the eddy current brake in question also depends on the number of magnetic poles, it is advantageous to further increase the damping by magnetizing the follower magnet on its brake part farther away from the measuring tube, and preferably giving it several north pole/south pole pairs.

As a rule, as already mentioned, it is desirable to have, besides the direct mechanical display of the flow, an electrical measurement signal at one output of the display device as well. If for this purpose, two magnetic field sensors are used that scan the magnetic field of the follower magnet and have identical measurement axes running parallel to the axis of the measuring tube, whose output signals are fed to an evaluation circuit to find the difference as a measurement for the flow, this guarantees that the electrical measurement signal is independent of outside interfering magnetic fields, like the earth field, for example. The design explained above and the embodiments explained below of the suspended-body flow meter according to the invention are independent of the embodiment of the follower magnet described further above.

A suspended-body flow meter, in which it does not happen that it provides a display without extra energy, can also supply an electrical output signal without a follower magnet, if it is designed so that there are two magnetic-field sensors scanning the magnetic field of the permanent magnet connected to the suspended body. The above-mentioned independence from outside interfering magnetic fields is achieved, in turn, according to the invention by having the magnetic-field sensors arranged with identical measurement axes running parallel to the axis of the measuring tube and an evaluation circuit to find the difference in the output signals of the magnetic-field sensors as a measurement of the flow. Preferably, the magnetic-field sensors are provided with magnetic-field concentrators directed at the measuring tube or at the permanent magnet connected to the suspended body. The magnetic-field concentrators permit a relatively large distance between the magnetic-field sensors and the measuring tube or the permanent magnet connected to the suspended body, so that the influence of the temperature of the medium flowing through the measuring tube on the magnetic-field sensors is relatively slight.

It is also recommended that there be magneto-resistive magnetic-field sensors for the above-mentioned forms of embodiment of the suspended-body flow meter according to the invention.

There are various ways of designing and developing the suspended-body flow meter according to the invention. For them, please refer to the dependent patent claims, on one hand, and to the description of the preferred embodiments in connection with the drawings, on the other.

BRIEF DESCRIPTION OF THE DRAWINGS

The invention description below refers to the accompanying drawings, in which.

DETAILED DESCRIPTION OF AN ILLUSTRATIVE EMBODIMENT

Figure 1:
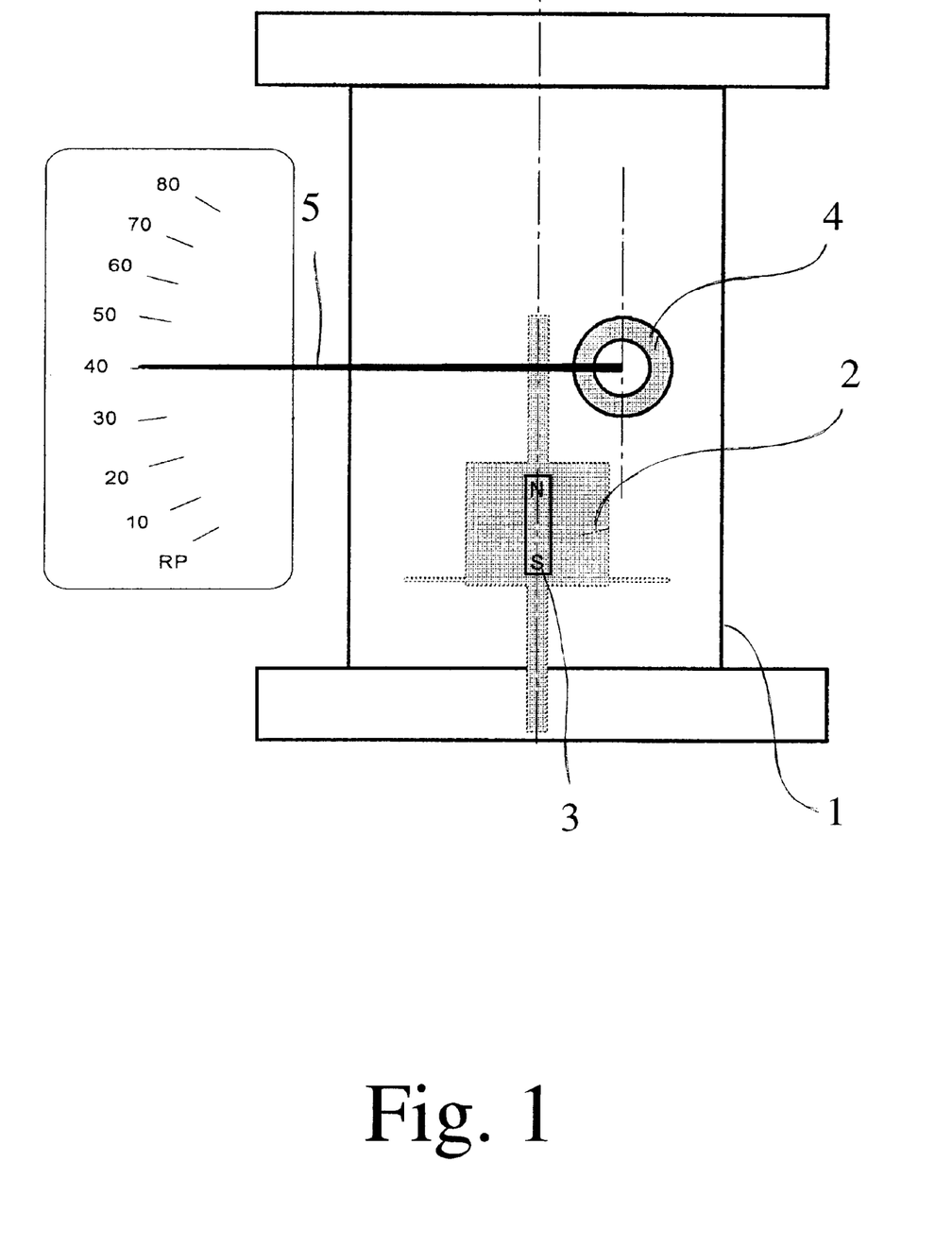
FIG. 1 shows schematically a first embodiment of a suspended-body flow meter according to the invention, in vertical section.

The main design of a suspended body flow meter according to the invention is clear from the drawing of the first embodiment in FIG. 1. This suspended-body flow meter has a measuring tube 1, a suspended body 2 that is arranged in the measuring tube 1 and can move in the direction of flow, a permanent magnet 3 arranged in the suspended body 2, a rotatably mounted follower magnet 4 that follows the movements of the permanent magnet 3 and is arranged in the suspended body 2, and a display device converting the movements of the follower magnet 4, here designed as a pointer 5. It can also be seen from FIG. 1 that the follower magnet 4 is designed as an annular permanent magnet.

Figure 2:
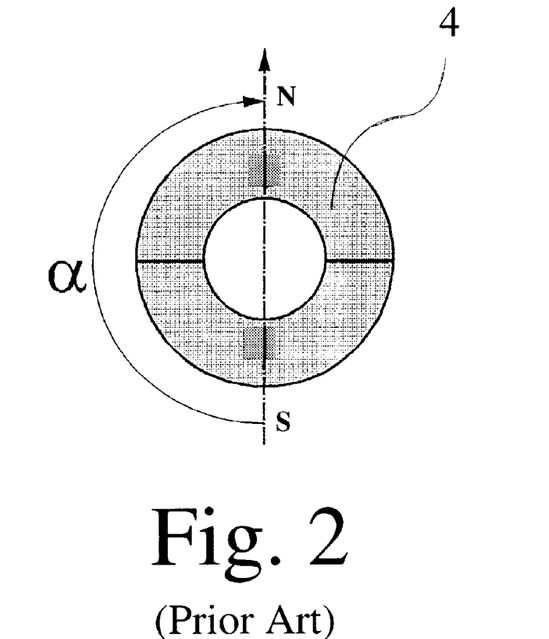
FIG. 2 shows a top view of the diametrically magnetized annular follower magnet designed with two poles and known in the prior art.

On the suspended-body flow meters known from the prior art, the annular follower magnet is diametrically magnetized; the north pole and the south pole form an angle α of 180°. This is shown in FIG. 2.

Figure 3:
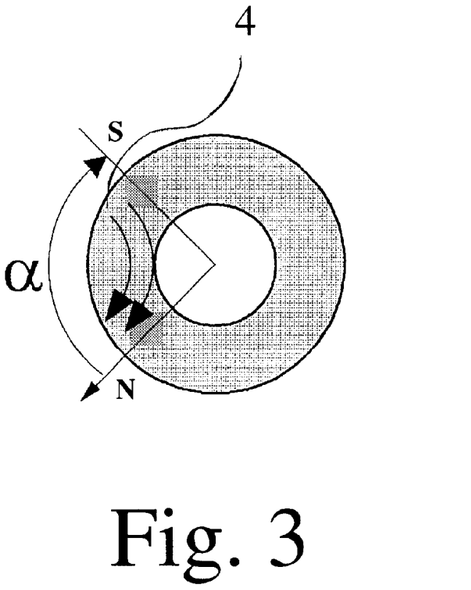
FIG. 3 shows a first embodiment of an annular, laterally magnetized follower magnet according to the invention.
Figure 4:
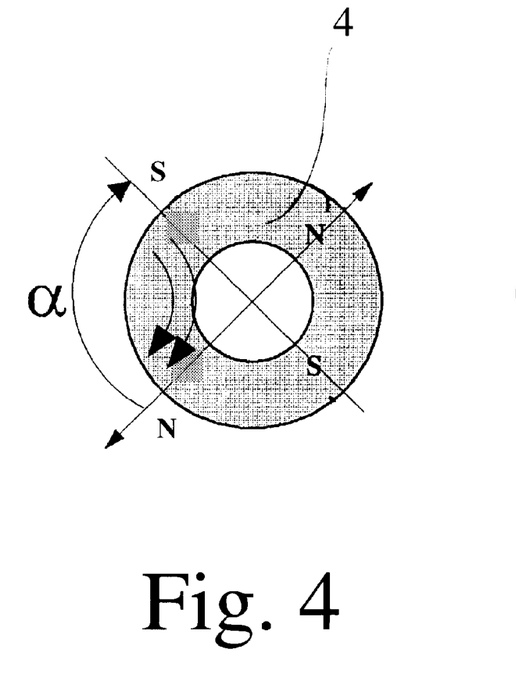
FIG. 4 shows a second embodiment of an annular, laterally magnetized follower magnet according to the invention.
Figure 5:
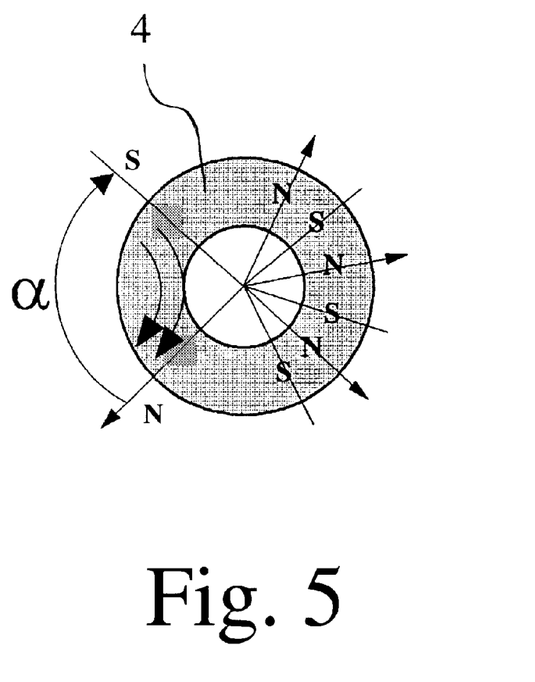
FIG. 5 shows a third embodiment of an annular, laterally magnetized follower magnet according to the invention.

FIGS. 3, 4 and 5 show follower magnets 4, as they can be used in the suspended-body flow meters that are shown in FIGS. 1 and 8 to 11. It is important that the annular follower magnet 4 be magnetized laterally and on its coupling part closer to the measuring tube 1, the north pole and the south pole form an angle a of preferably about 90°, in the examples of embodiment shown in FIGS. 3, 4 and 5, exactly 90°.

The design, according to the invention, as already mentioned at the beginning, guarantees that the movement, hence the angle of rotation of the follower magnet 4, is the is same with the same stroke of the suspended body 2, over a wide range of different nominal widths of the measuring tube 1. This result is basically independent of the design of the follower magnet 4 on the part of the follower magnet turned away from the coupling part.

Figure 6:
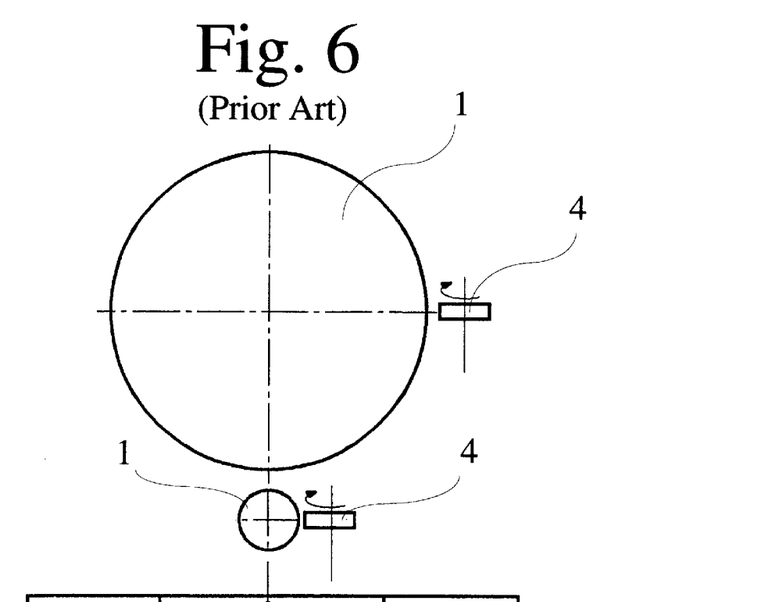
FIGS. 6 and 7 show schematically two suspended-body flow meters in connection with the follower magnet known from the prior art.
Figure 7:
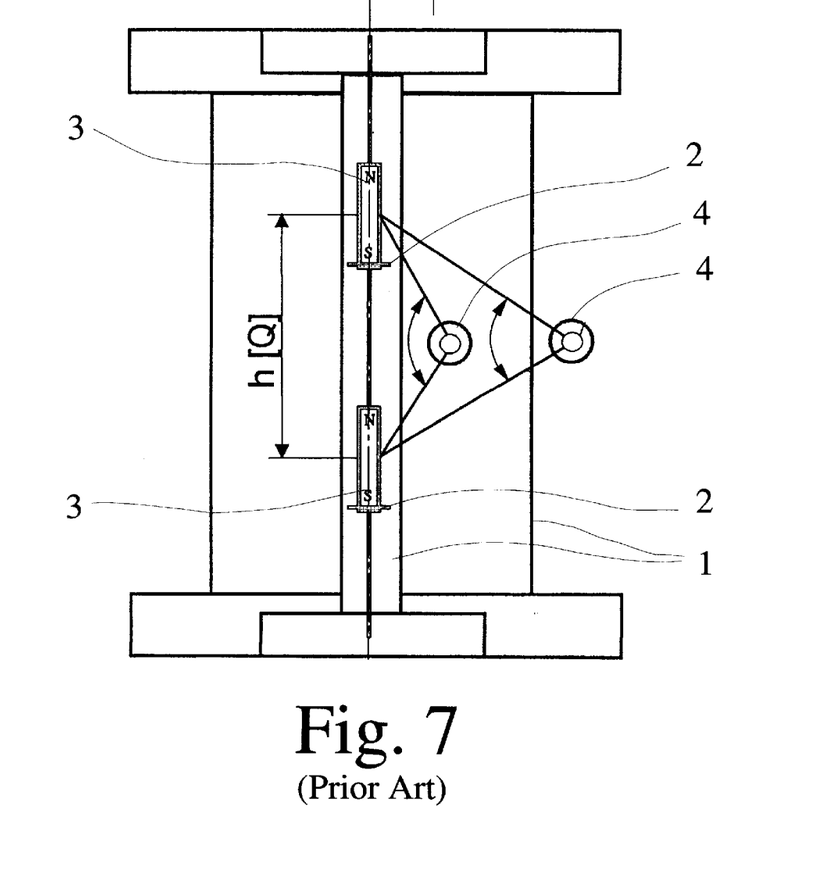
Figure 8:
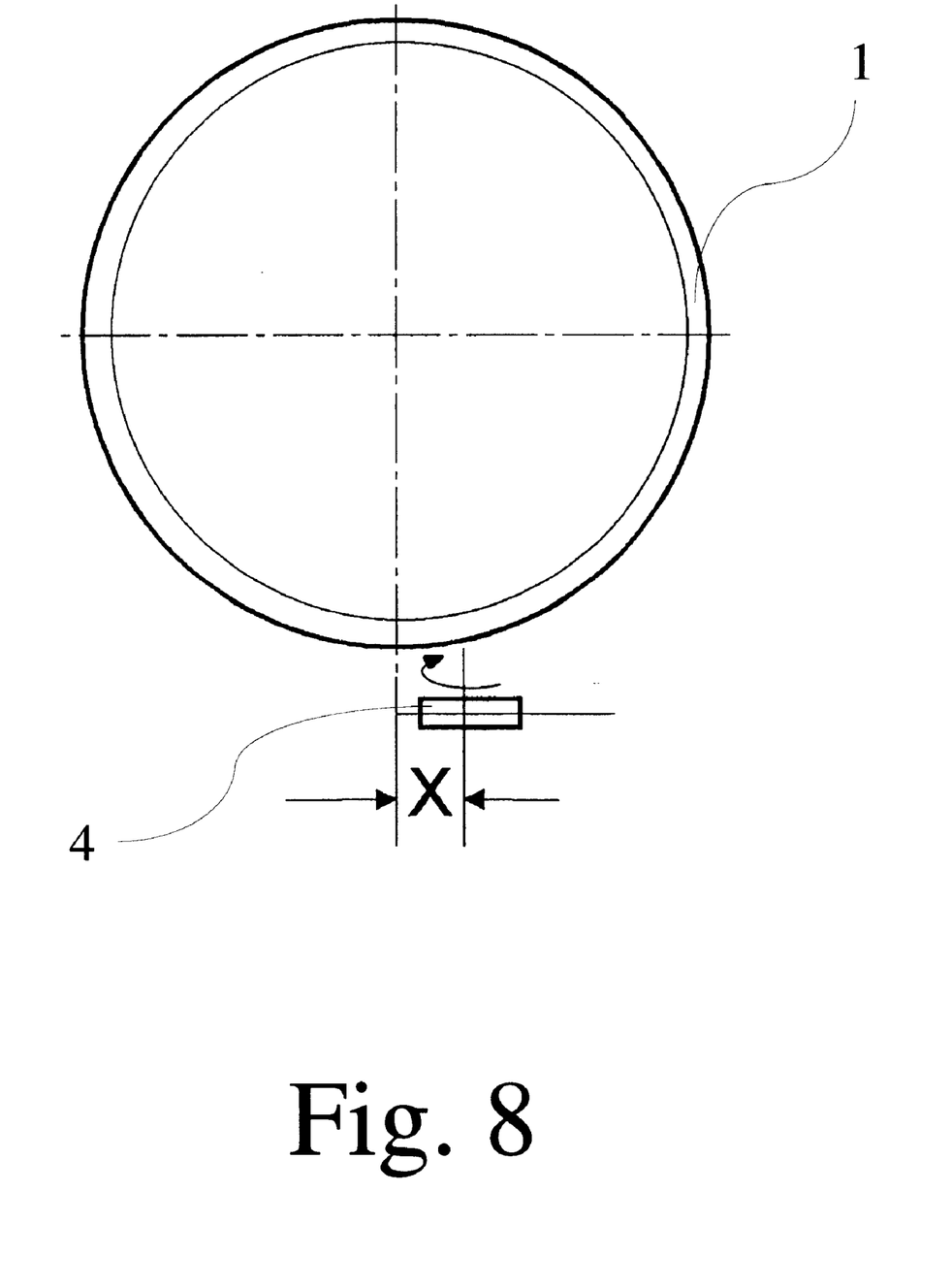
FIG. 8 shows the first embodiment of the suspended-body flow meter according to the invention, in horizontal section.

FIGS. 6 and 7 show an embodiment of a suspended-body flow meter known from the state of the art, which again demonstrates clearly the problem with the known suspended-body flow meter. FIG. 6 shows the position of the follower magnet 4 in relation to the measuring tube 1 for two very different nominal widths. Here, there is the problem shown in FIG. 7 that the follower magnet 4 in the conventional design known from the state of the art placed at the same distance from the measuring tube 1, depending on the nominal width of the measuring tube 1 with the same stroke of the suspended body 2 and the permanent magnet 3 provided therein, makes different angles of rotation. It can be seen clearly in FIG. 7 that the follower magnet 4, in connection with a measuring tube 1 with smaller nominal widths with the same stroke of the suspended body 2 and the permanent magnet 3 connected to it, makes a much larger angle of rotation than is the case when the same follower magnet 4 is placed on a measuring tube 1 with clearly larger nominal widths. In the state of the art, scales with a different spread are therefore necessary for different nominal widths of the measuring tube 1.

In the embodiment shown in FIGS. 6 and 7 of a suspended-body flow meter known from the state of the art, the follower magnet 4 is arranged in such a way that the median plane of the follower magnet 4 intersects the axis of the measuring tube 1. In contrast to this, it can be inferred from FIG. 8 that in the example of a suspended-body flow meter according to the invention shown here, the median plane of the follower magnet 4 neither contacts nor intersects the measuring tube 1. With such an arrangement, to guarantee a movement of the follower magnet 4 depending on the movement of the suspended body 2, the distance X between the axis of the follower magnet 4 and the axis of the measuring tube 1 must be larger than zero. The distance X given between the axis of the follower magnet 4 and the axis of the measuring tube and the diameter of the follower magnet 4 are is conditional on one another, the distance X must be larger than half the diameter of the follower magnet 4. In addition, the stroke-dependent angle of rotation of the follower magnet can be predetermined from the distance X; a certain scale hence requires a certain distance X.

Figure 9:
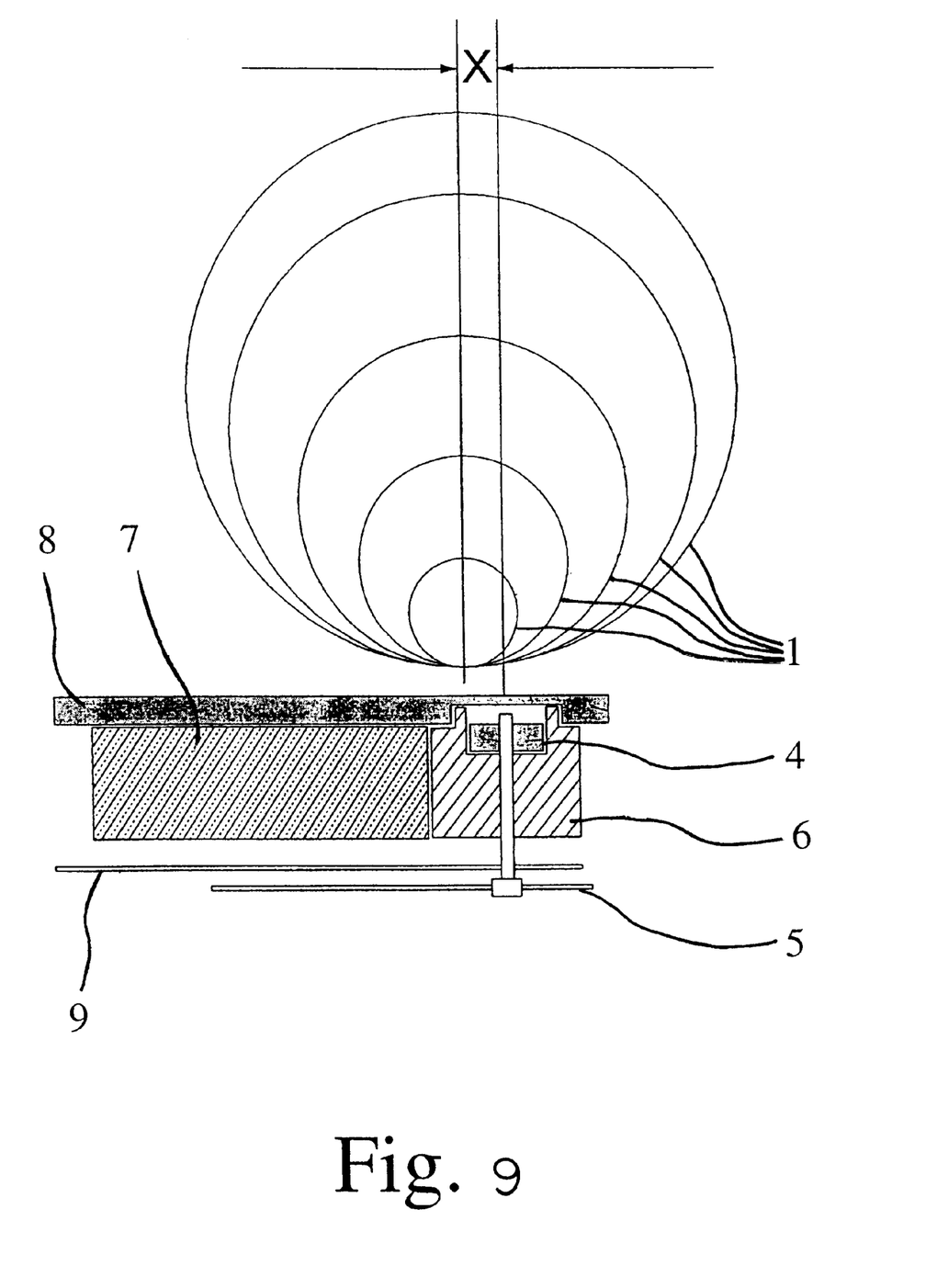
FIG. 9 shows a second embodiment of a suspended-body flow meter according to the invention, in which measuring tubes of various nominal widths are indicated.

FIG. 9 shows a housing 8 holding the follower magnet 4, a metal bushing 6 and the electronics 7. A pointer 5 is attached to the follower magnet 4 as a display device, and it supplies a measured value for the flow through the suspended-body flow meter by its setting on a scale 9. Above the housing 8, there are various measuring tubes 1 with different nominal widths. According to the invention, the follower magnet 4 forms the same angle of rotation with the same movement of a suspended body, not shown, with various nominal widths of the measuring tube 1. This advantage of the invention is guaranteed at a constant distance X between the axis of the follower magnet 4 and the axis of the measuring tube 1. The desired angle of rotation can be set by a variation in the distance X regardless of the nominal width of the measuring tube 1.

The metal bushing 6 shown in FIG. 9 forms the stand of an eddy current brake formed by the follower magnet 4 and the metal bushing 6, wherein the metal bushing 6 is made of an electrically conductive, non-ferromagnetic material, for example, of aluminum or copper. The braking effect is amplified by making the air gap between the follower magnet 4 and the metal bushing 6 as small as possible and making the follower magnet 4 out of a rare earth metal. Further amplification of the braking effect is guaranteed by the design of the follower magnet 4 shown in FIG. 5. The multiple north-south polarization of the follower magnet 4 shown in FIG. 5 on its brake part farther away from the measuring tube 1 increases the magnetic field strength determining the braking effect between the braking part of the follower magnet 4 and the metal bushing 6.

Figure 10:
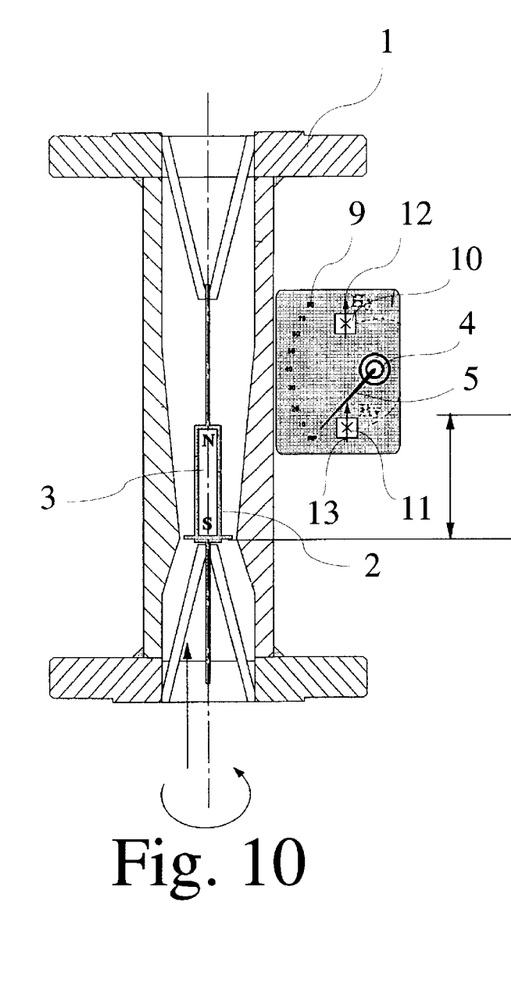
FIGS. 10 and 11 show a side view, partially sectioned, of a third embodiment of a suspended-body flow meter according to the invention in connection with a display device supplying an electrical measuring signal.
Figure 11:
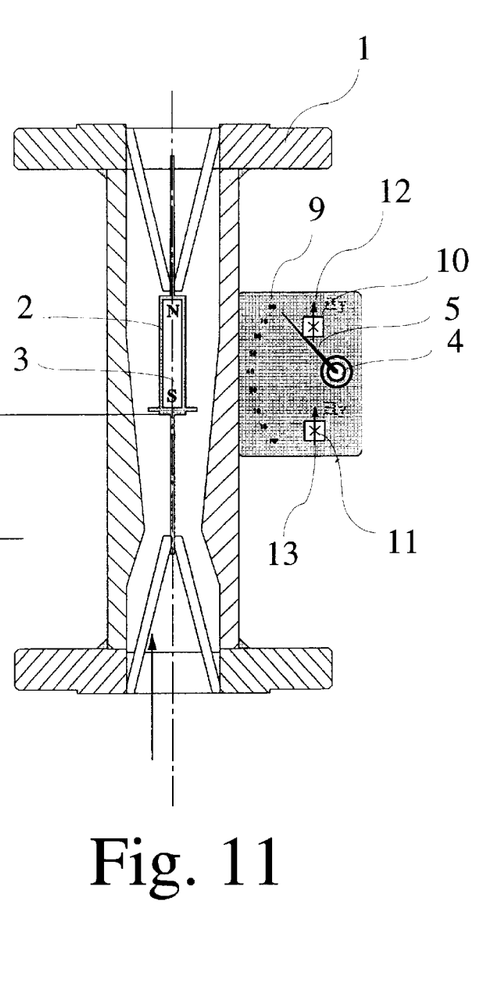

FIGS. 10 and 11 show another embodiment of a suspended-body flow meter according to the invention, in which there is an electrical measurement signal besides the analog indicator signal. FIG. 10 shows this embodiment of the suspended-body flow meter according to the invention without flow and FIG. 11 with full flow. It can be seen from those figures that the length of the suspended body 2 roughly corresponds to the maximum stroke of the suspended body 2, guaranteeing that the coupling between the permanent magnet 3 and the follower magnet 4 cannot be lost.

As FIGS. 10 and 11 show, there are two magnetic-field sensors 10, 11 that scan the magnetic field of the follower magnet 4 with identical measurement axes 12, 13 running parallel to the axis of the measuring tube 1. The output signals of the magnetic field sensors 10, 11 are fed to an evaluation circuit (not shown), to find the difference in the output signals of the magnetic-field sensors 10, 11 as a measurement of the flow. This guarantees great insensitivity to interference from outside magnetic fields. In addition, a rotational movement of the permanent magnet 3 connected to the suspended body 2 has no influence on the measurement results.

Figure 12:
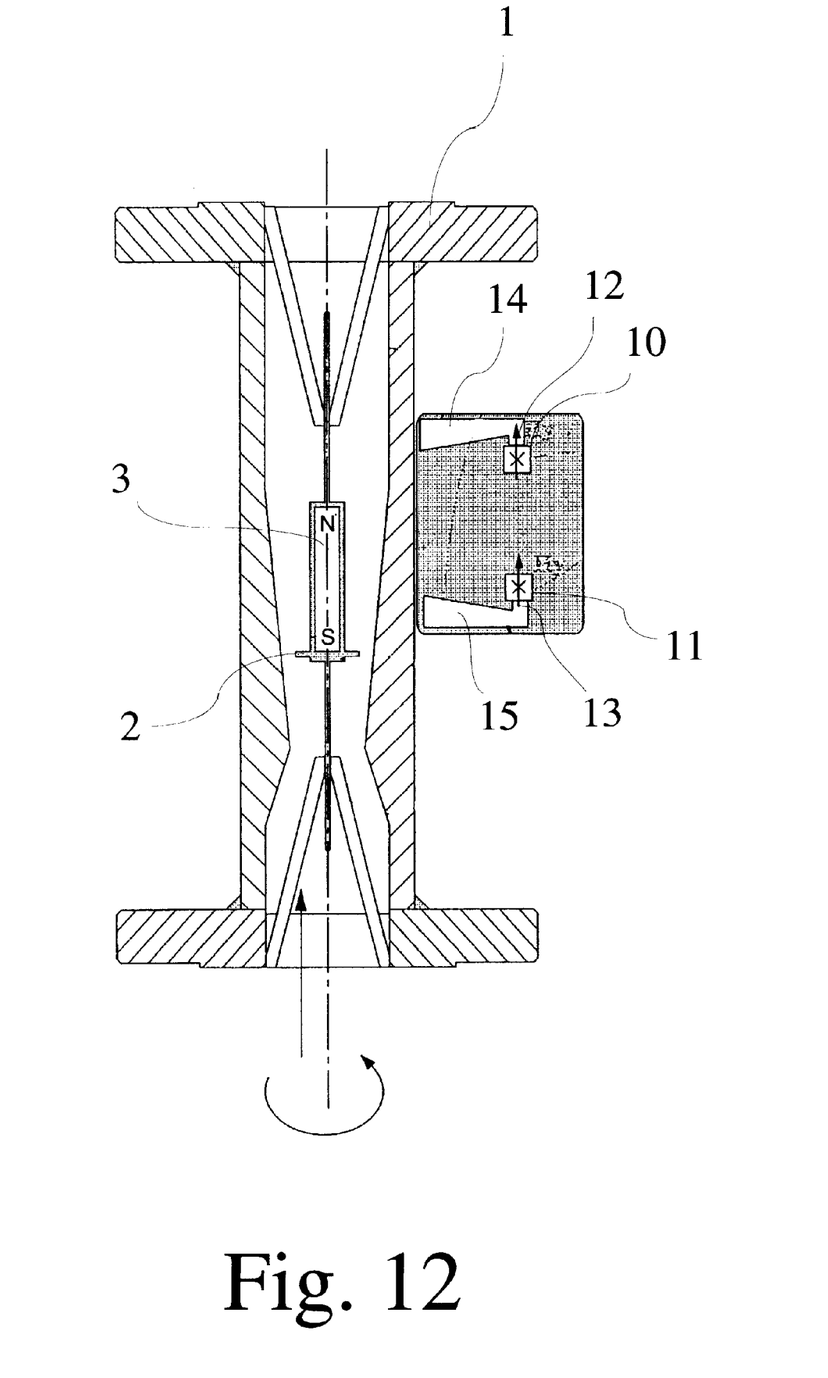
FIG. 12 shows a side view, partially sectioned, of a fourth embodiment of a suspended-body flow meter according to the invention without a follower magnet.

Finally, FIG. 12 shows another embodiment of a suspended-body flow meter according to the invention, in which there is no follower magnet. In this form of embodiment, the magnetic field of the permanent magnet connected to the suspended body 2 is scanned. To increase the magnetic field at the site of the magnetic-field sensors 10, 11, there are magnetic-field concentrators 14, 15 directed at the pointing at the permanent magnet 3 connected to the suspended body 2 which take the magnetic field to the site of the magnetic field sensors 10, 11 and bundle it there. The relatively long distance between the magnetic-field sensors 10, 11 and the measuring tube 1 or the permanent magnet 3 connected to the suspended body 2 that can be achieved by this has the advantage that the thermal resistance between the measuring tube 1 and the magnetic field sensors 10, 11 is relatively high, so that the temperature of the medium flowing in the measuring tube 1 has practically no influence on the measurement signal.

Finally, it should also be pointed out that magneto-resistive magnetic-field sensors 10, 11 are used in the embodiments in FIGS. 10 and 11.

What is claimed is:

1. A suspended-body flow meter for flowing media of the type having a measuring tube (1), a suspended body (2) that can move in the flow direction and is arranged in the measuring tube (1), at least one permanent magnet (3) connected to the suspended body (2), at least one rotatably mounted follower magnet (4) that follows the movements of the permanent magnet (3) connected to the suspended body (2) and arranged outside the measuring tube (1) and a display device converting the movements of the follower magnet (4), the follower magnet (4) being constructed as an annular permanent magnet, wherein the annular follower magnet (4) is magnetized laterally, and on its coupling part closer to the measuring tube (1), the north pole and south pole form an angle of clearly less than 180°.

2. The suspended-body flow meter defined in claim 1 wherein the follower magnet (4) is arranged so that its median plane does not contact or intersect the measuring tube (1) and so that the distance X between the axis of the follower magnet (4) and the axis of the measuring tube (1) is greater than zero.

3. The suspended-body flow meter defined in claim 1 or 2, wherein there is a metal bushing (6) open magnetically in the direction of the measuring tube (1) and the follower magnet (4) is received in the metal bushing (6) without contact.

4. The suspended-body flow meter defined in claim 3, wherein the metal bushing (6) is made of an electrically conductive, non-ferromagnetic material, such as aluminum or copper.

5. The suspended-body flow meter defined in claims 1 or 2, wherein the follower magnet (4) is made of a rare earth metal, such as a samarium-cobalt alloy.

6. The suspended-body flow meter defined in claim 3, wherein the follower magnet (4) is made of a rare earth metal, such as a samarium-cobalt alloy.

7. The suspended-body flow meter defined in claim 4, wherein the follower magnet (4) is made of a rare earth metal, such as a samarium-cobalt alloy.

8. The suspended-body flow meter defined in claim 3, wherein the follower magnet (4) is magnetized on its braking part farther from the measuring tube (1), and has at least one pair of north-south poles.

9. The suspended-body flow meter defined in claim 4, wherein the follower magnet (4) is magnetized on its braking part farther from the measuring tube (1) and has at least one pair of north-south poles.

10. The suspended-body flow meter defined in claim 5, wherein the follower magnet (4) is magnetized on its braking part farther from the measuring tube (1) and has at least one pair of north-south poles.

11. The suspended-body flow meter defined in claim 6, wherein the follower magnet (4) is magnetized on its braking part farther from the measuring tube (1) and has at least one pair of north-south poles.

12. The suspended-body flow meter defined in claim 7, wherein the follower magnet (4) is magnetized on its braking part farther from the measuring tube (1) and has at least one pair of north-south poles.

13. The suspended-body flow meter defined in claim 1 or 2, and further including two magnetic field sensors (10, 11) scanning the magnetic field of the follower magnet (4) with identical measurement axes (12, 13) running parallel to the axis of the measuring tube (1), said sensors producing output signals, and an evaluation circuit for finding the difference between the output signals of the magnetic field sensors (10, 11) as a measurement of the flow.

14. A suspended-body flow meter for flowing media of the type having a measuring tube (1), a suspended body (2) that can move in the flow direction and is arranged in the measuring tube (1) and at least one permanent magnet (3) connected to the suspended body (2), said flow meter also including two magnetic field sensors (10, 11) scanning the magnetic field of the permanent magnet (3) with identical measurement axes (12, 13) running parallel to the axis of the measuring tube (1) and producing output signals, and an evaluation circuit for finding the difference between the output signals of the magnetic field sensors (10, 11) as a measurement of the flow.

15. A suspended-body flow meter for flowing media of the type having a measuring tube (1), a suspended body (2) that can move in the flow direction and is arranged in the measuring tube (1) and at least one permanent magnet (3) connected to the suspended body (2), said flow meter also including two magnetic field sensors (10, 11) scanning the magnetic field of the permanent magnet (3) with identical measurement axes (12, 13) running parallel to the axis of the measuring tube (1) and producing output signals, said magnetic field sensors (10, 11) having magnetic field concentrators (14, 15) directed at the measuring tube (1) or at the permanent magnet (3) connected to the suspended body (2), and an evaluation circuit for finding the difference between the output signals of the magnetic field sensors (10, 11) as a measurement of the flow.

16. The suspended-body flow meter defined in claim 13, wherein the magnetic field sensors (10, 11) comprise magneto-resistive magnetic-field sensors.

17. The suspended-body flow meter defined in claim 15, wherein the magnetic field sensors (10, 11) comprise magneto-resistive magnetic-field sensors.

18. The suspended-body flow meter defined in claim 14, wherein the magnetic field sensors (10, 11) comprise magneto-resistive magnetic-field sensors.

19. The suspended-body flow meter referred in claim 1 wherein said angle is about 90°.

* * * * *